United States Patent
Montemayor et al.

(10) Patent No.: US 7,805,611 B1
(45) Date of Patent: Sep. 28, 2010

(54) METHOD FOR SECURE COMMUNICATION FROM CHIP CARD AND SYSTEM FOR PERFORMING THE SAME

(75) Inventors: Oscar Montemayor, San Jose, CA (US); Joe T. Wei, San Jose, CA (US); Ellen H. Siegel, San Carlos, CA (US)

(73) Assignee: Oracle America, Inc., Redwood City, CA (US)

( * ) Notice: Subject to any disclaimer, the term of this patent is extended or adjusted under 35 U.S.C. 154(b) by 1350 days.

(21) Appl. No.: 11/004,707

(22) Filed: Dec. 3, 2004

(51) Int. Cl.
  *H04L 29/06* (2006.01)
  *H04L 9/32* (2006.01)
  *H04L 9/00* (2006.01)
  *H04L 9/08* (2006.01)
  *H04K 1/00* (2006.01)
  *G06F 21/00* (2006.01)

(52) U.S. Cl. .................. 713/172; 713/150; 380/255; 380/262

(58) Field of Classification Search ............... 713/150, 713/168–169, 171; 380/255–257, 259, 262, 380/264, 277–279, 281–286, 28–30; 705/50
See application file for complete search history.

(56) References Cited

U.S. PATENT DOCUMENTS

| | | | |
|---|---|---|---|
| 4,227,253 A * | 10/1980 | Ehrsam et al. | 380/45 |
| 4,933,971 A * | 6/1990 | Bestock et al. | 380/44 |
| 5,048,085 A * | 9/1991 | Abraham et al. | 713/159 |
| 5,202,922 A * | 4/1993 | Iijima | 380/45 |
| 5,227,613 A * | 7/1993 | Takagi et al. | 235/380 |
| 5,293,029 A * | 3/1994 | Iijima | 235/380 |
| 5,319,705 A * | 6/1994 | Halter et al. | 705/54 |
| 5,502,765 A * | 3/1996 | Ishiguro et al. | 705/67 |
| 5,768,381 A * | 6/1998 | Hawthorne | 380/284 |
| 6,286,103 B1 * | 9/2001 | Maillard et al. | 726/26 |
| 6,385,317 B1 * | 5/2002 | Rix et al. | 380/258 |
| 6,409,089 B1 * | 6/2002 | Eskicioglu | 235/492 |
| 6,507,907 B1 * | 1/2003 | Takahashi et al. | 713/150 |
| 6,999,948 B1 * | 2/2006 | Hatanaka et al. | 705/65 |
| 2004/0218762 A1 * | 11/2004 | Le Saint et al. | 380/277 |
| 2004/0250066 A1 * | 12/2004 | Di Luoffo et al. | 713/168 |

(Continued)

OTHER PUBLICATIONS

Global Platform Open Platform Card Specification, Apr. 7, 2000, GlobalPlatform Inc., Version 2.0.1.*

(Continued)

*Primary Examiner*—Kimyen Vu
*Assistant Examiner*—Darren Schwartz
(74) *Attorney, Agent, or Firm*—Martine Penilla & Gencarella, LLP (57) ABSTRACT

A method and system is provided to secure a data transmission from a chip card to an off-card entity. A transport key is generated at the off-card entity. The transport key is transmitted in a secure manner from the off-card entity to the chip card. At the chip card, the transport key is used to encrypt data to be sent from the chip card to the off-card entity. The data having been encrypted at the chip card using the transport key is then transmitted from the chip card to the off-card entity. The off-card entity is capable of decrypting the data received from the chip card through use of the transport key previously generated at the off-card entity.

16 Claims, 4 Drawing Sheets

U.S. PATENT DOCUMENTS

2005/0033964 A1*  2/2005  Albanese et al. ............ 713/171
2005/0289652 A1* 12/2005  Sharma et al. ................ 726/26

OTHER PUBLICATIONS

Global Platform Open Platform Card Specification , Jun. 4, 2001, GlobalPlatform Inc., Version 2.1.*

Java Card TM Application Programming Interface , Jun. 7, 1999, Sun Microsystems Inc., Version 2.1.*

Schneier, Bruce, "Applied Cryptography, Protocols, Algorithms, and Source Code in C," 1996, John Wiley & Sons Inc, Second Edition, pp. 294-295.*

* cited by examiner

Fig. 4

METHOD FOR SECURE COMMUNICATION FROM CHIP CARD AND SYSTEM FOR PERFORMING THE SAME

BACKGROUND

A chip card is a card that includes a microprocessor and a memory. The microprocessor is capable of operating in accordance with program instructions stored in the memory on the chip card. In comparison with traditional magnetic stripe cards, chip cards provide increased memory for storing data and increased security of stored data. Chip cards can be used for a variety of applications, particularly applications that require manipulation of large numbers, such as applications involving cryptographic processes. Therefore, chip cards are well-suited for applications that require secure digital identity. For example, in one application a chip card can be used to provide secure access to a computing network.

Chip card standards have been developed to provide a common programming standard for use by different chip card manufacturers. The chip card standards are intended to facilitate chip card application portability between chip cards of different manufacturers. The "Global Platform Open Platform Card Specification, Version 2.0.1," ("Open Platform Specification" for ease of discussion) is a chip card standard that has been extensively adopted throughout the chip card industry. The Open Platform Specification provides a common security and chip card management architecture for protecting the chip card system infrastructure. The Open Platform Specification defines card components, command interfaces, transaction sequences, and common interfaces to enable creation of multi-application chip card systems.

The Open Platform Specification, particularly Version 2.0.1, defines a secure channel protocol to secure commands and data sent from an application process operating on an off-card entity, such as a server computer system, to a selected application operating on the chip card. In accordance with the Open Platform Specification, the secure channel is secured by using a shared secret. More specifically, a diversified master key unique to a particular chip card is used to mutually authenticate the server to the chip card and the chip card to the server. Also, the diversified master key is used to generate a session key that can be used to secure, i.e., encrypt, data being communicated from the off-card entity to the chip card. However, the Open Platform Specification, Version 2.0.1, does not provide for securing data communicated from the chip card to the off-card entity. Thus, a potential exists for man-in-the-middle attacks during data transmission from the chip card to the off-card entity.

In view of the foregoing, a solution is needed to provide for securing data communicated from the chip card to the off-card entity. Furthermore, the solution should be capable of being implemented on chip cards designed to comply with the Open Platform Specification, Version 2.0.1.

SUMMARY

It should be appreciated that the present invention can be implemented in numerous ways, such as a process, an apparatus, a system, a device or a method on a computer readable medium. Several inventive embodiments of the present invention are described below.

In one embodiment, a method for securing a data transmission from a chip card to an off-card entity is disclosed. The method includes an operation for generating a transport key at the off-card entity. In another operation, the transport key is transmitted in a secure manner from the off-card entity to the chip card. An operation is also provided for using the transport key to encrypt data at the chip card to be sent from the chip card to the off-card entity. The method further includes an operation for transmitting the data having been encrypted using the transport key from the chip card to the off-card entity.

In another embodiment, a method for securing data transmitted from a chip card is disclosed, wherein the chip card is compliant with Global Platform Open Platform Specification, Version 2.0.1. The method includes an operation for establishing a secure channel between a back-end system and the chip card. The back-end system is then operated to generate a transport key at the back-end system. In another operation, the transport key is transmitted from the back-end system to the chip card using the secure channel. The method further includes an operation for extracting the transport key at the chip card. The chip card is then operated to use the extracted transport key to encrypt data to be transmitted from the chip card to the back-end system. Additionally, an operation is performed to transmit the encrypted data from the chip card to the back-end system. The transport key generated at the back-end system is used to decrypt the data having been transmitted from the chip card to the back-end system.

In another embodiment, a system for transmitting data between a chip card and an off-card entity is disclosed. The system includes a server computer system defined to execute an application for generating a transport key. The system also includes a chip card reader connected to communicate with the server computer system. The system further includes a chip card connected to communicate with the chip card reader. The chip card is capable of communicating with the server through the chip card reader by way of a secure channel. Using the secure channel, the chip card is defined to receive the transport key from the server computer system. The chip card is further defined to execute an application that directs use of the transport key to encrypt data to be communicated from the chip card to the server computer system.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

Figure 1:
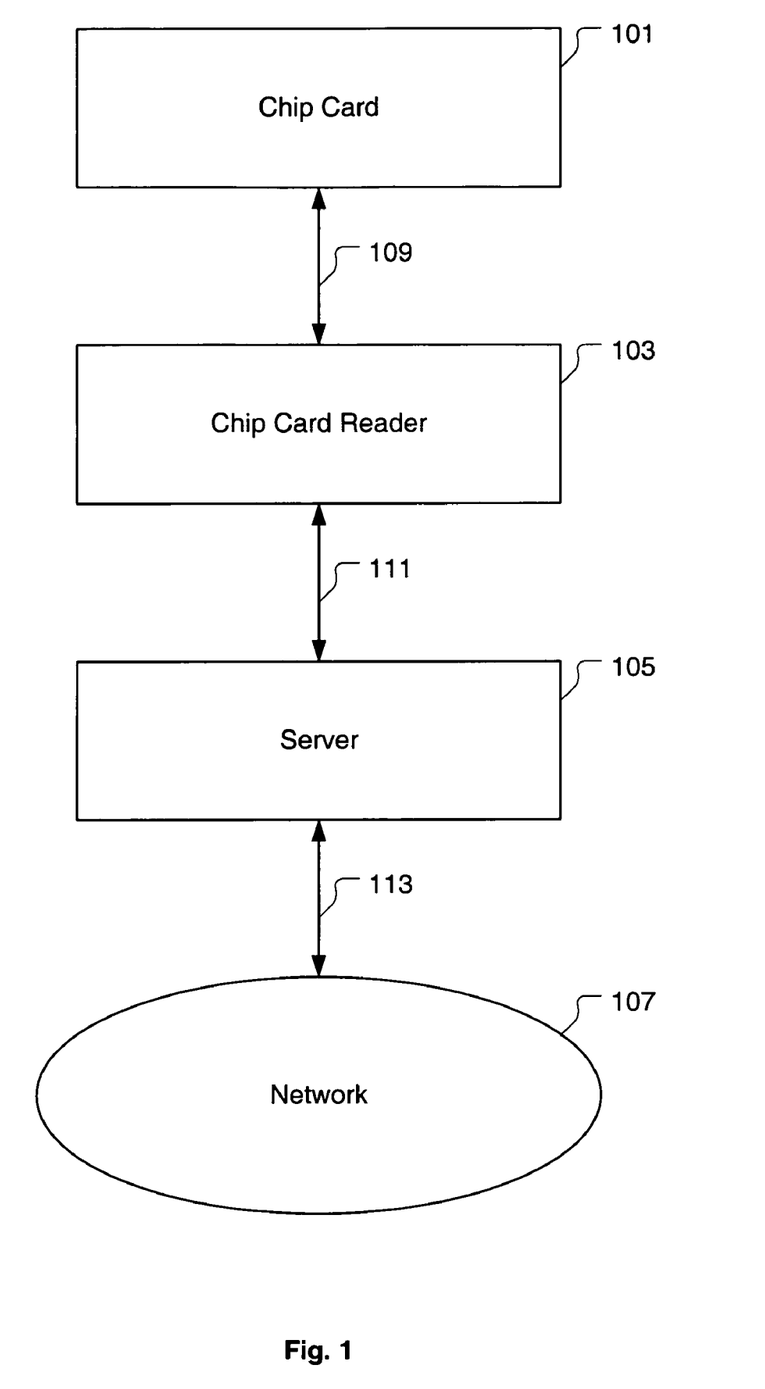
FIG. 1 is an illustration showing a system for transmitting data between a chip card and an off-card entity, in accordance with one embodiment of the present invention.

FIG. 1 is an illustration showing a system for transmitting data between a chip card and an off-card entity, in accordance with one embodiment of the present invention. The system includes a server computer system ("server") 105, a chip card reader 103, and a chip card 101. Two-way data communication can be conducted between the server 105 and the chip card reader 103, as indicated by arrow 111. Also, two-way data communication can be conducted between the chip card reader 103 and the chip card 101, as indicated by arrow 109. It should be appreciated that the chip card reader 103 functions to enable two-way data communication between the server 105 and the chip card 101. Additionally, the server 105 is capable of communicating with a network 107, as indicated by arrow 113. It should be appreciated that the network 107 can include essentially any type of device having an interface and communication compatibility with the server 105. In one embodiment, the server 105 is a secure server configured to require an entity to be authorized and authenticated prior to yielding access to the server 105. Also, in one embodiment, the chip card is a JAVA™ Card compliant with JAVA™ Card Enterprise Software. For discussion purposes, it should be considered that both the chip card 101 and the server 105, as referenced in the discussion to follow, are each defined to be compliant with the "Global Platform Open Platform Specification, Version 2.0.1," (also referred to as the "Open Platform Specification" for discussion purposes).

Figure 2:
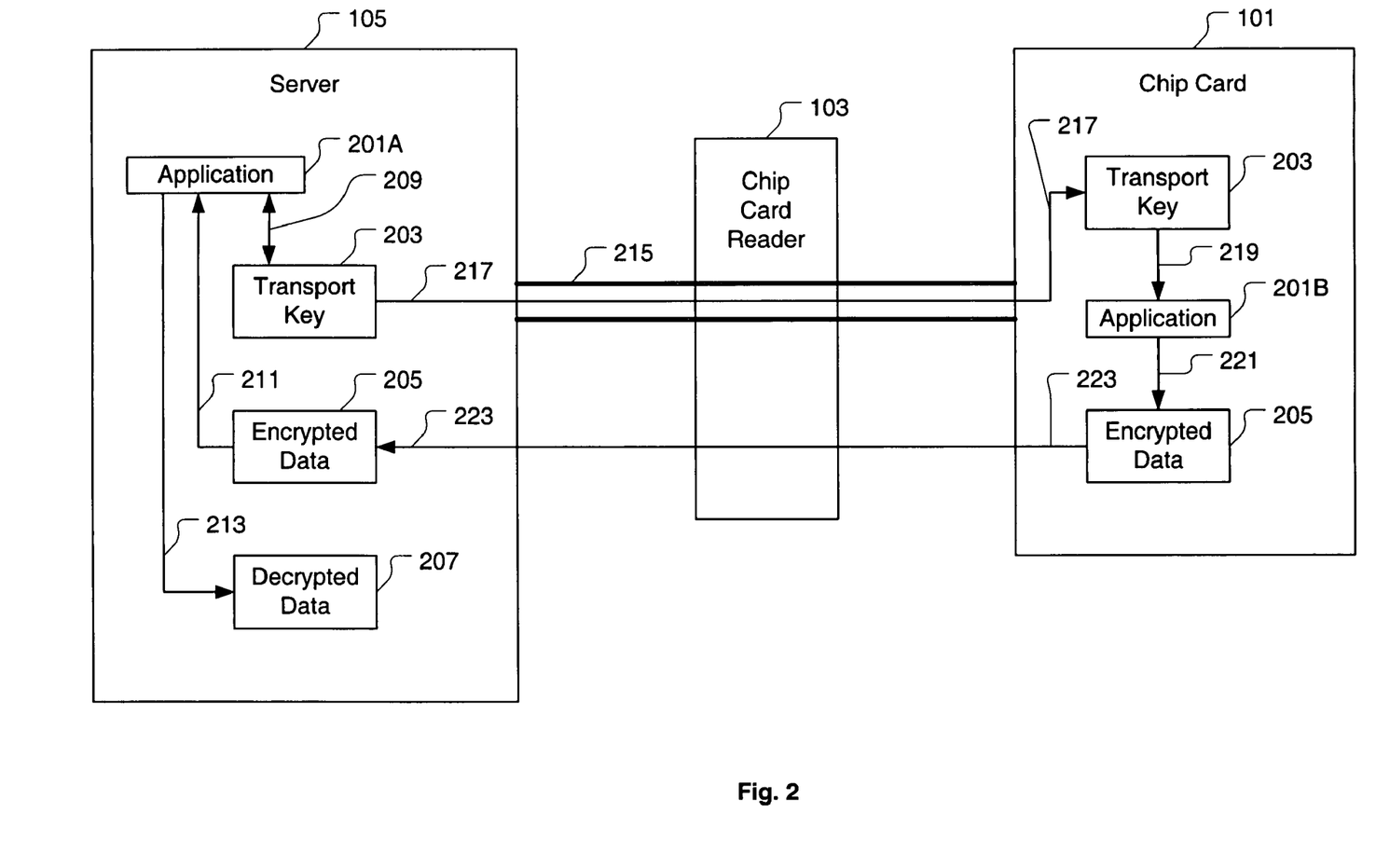
FIG. 2 is an illustration showing an exemplary functional diagram of the system of FIG. 1, in accordance with one embodiment of the present invention.

FIG. 2 is an illustration showing an exemplary functional diagram of the system of FIG. 1, in accordance with one embodiment of the present invention. Since both the server 105 and the chip card 101 are compliant with the Open Platform Specification, a secure channel 215 can be established between the server 105 and the chip card 101 in accordance with the requirements of the Open Platform Specification. The secure channel provides a secure communication channel between the server 105 and the chip card 101. It should be appreciated, however, that the secure channel 215 provides secure communication in the communication direction initiating at the server 105 and terminating the chip card 101, but not in the reverse direction. As described in detail in the Open Platform Specification, the secure channel provides mutual authentication between the server 105 and the chip card 101, ensures the data received by the chip card 101 is from an authenticated source, i.e., the server 105, ensures the data is received in an unaltered state, and ensures confidentiality of the data received by the chip card 101.

In accordance with the present invention, the server 105 is defined to execute an application 201A for generating a transport key 203. The server 105 is configured to store the generated transport key 203 in a memory location on the server 105. The application 201A is capable of writing/reading the transport key 203 to/from the memory location on the server 105 as indicated by arrow 209. In one embodiment, the transport key 203 is generated upon establishment of a secure session between the server 105 and the chip card 101, wherein establishment of the secure session is associated with establishment of the secure channel 215. In one embodiment, the transport key 203 is generated using a session key that is generated upon establishment of the secure session. It should be appreciated that the session key for a particular secure session is unique. Therefore, in this embodiment, the transport key 203 generated from the session key will be unique for each secure session. Having a unique transport key 203 for each secure session serves to reduce the risk of replay attacks on data encrypted using the transport key.

The application 201A is further defined to transmit the transport key 203 to the chip card 101 via the secure channel 215, as indicated by arrow 217. The transmission including the transport key 203 can be encrypted to protect the data in the transmission as well as the transport key 203. In one embodiment, the transport key 203 is embedded in a payload portion of a transmission packet sent from the server 105 to the chip card 101. The chip card 101 is equipped with a memory capable of storing the received transmission packet data including the transport key 203. Also, the chip card 101 is defined to execute an application 201B for extracting the transport key 203 from the received transmission packet and utilizing the transport key 203 to encrypt data. The application 201B on the chip card 101 and the application 201A on the server 105 are counterpart applications that include a common understanding of how the transport key 203 is generated, transmitted, extracted, and utilized.

Once the transport key 203 is extracted from the transmission packet received at chip card 101, the transport key 203 can be stored in the memory resident on the chip card 101. The application 201B is capable of acquiring the transport key 203, as indicated by arrow 210. Then, using the transport key 203, the application 201B is capable of encrypting data to be transmitted from the chip card 101 to the server 105. With respect to FIG. 2, transport key-encrypted data 205 is shown to be a product of the application 201B, as indicated by arrow 221. Once generated, the transport key-encrypted data 205 can be transmitted from the chip card 101 to the server 105, as indicated by arrow 223. It should be appreciated that use of the transport key 203 to encrypt the data to be transmitted to the server 105 from the chip card 101 serves to protect the data. Thus, transmission of the transport key-encrypted data from the chip card 101 to the server 105 can be conducted using essentially any transport mechanism, including a non-secure uplink channel, without exposing the data.

Upon receipt at the server 105, the transport key-encrypted data 205 can be passed to the application 201A for processing, as indicated by arrow 211. The application 201A is capable of directing the server 105 to acquire the transport key 203 from memory and use the transport key 203 to decrypt the transport key-encrypted data 205. With respect to FIG. 2, decrypted data 207 is shown to be a product of the application 201A, as indicated by arrow 213.

In accordance with the foregoing description, the transport key 203 serves as a shared secret between the server 105 and the chip card 101 to enable encryption of data to be communicated from the chip card 101 to the server 105. It should be understood that as opposed to the "Global Platform Open Platform Specification, Version 2.0.1" the present invention provides for secure communication of data in the direction initiating at the chip card 101 and terminating the server 105. Thus, the present invention enables secure two-way communication in the context of the "Global Platform Open Platform Specification, Version 2.0.1."

Though, the present invention as described can be implemented with essentially any Open Platform Specification compliant chip card 101, a particular embodiment exists in which the chip card 101 is defined as a JAVA™ Card. In this embodiment, the JAVA™ Card is defined to be compliant with JAVA™ Card Enterprise Software. Thus, the application 201B resident on the JAVA™ Card, i.e., chip card 101, can be defined as an applet. Also, during the JAVA™ Card provisioning process, the JAVA™ Card system extracts Public Key Interface (PKI) credentials from the JAVA™ Card to use and/or store in the back-end, i.e., the server 105. Consequently, the PKI credentials are known to both the server 105 and the chip card 101. Therefore, extraction of the PKI credentials enables the server 105 to encrypt the transmission including the transport key 203 such that the system is not subject to snooping or man-in-the-middle attacks.

In addition to the transport key 203 used to protect data to be transmitted from the chip card 101 to the server 105, the principles of the present invention can also be used to protect a message authentication code (MAC) to be transmitted from the chip card 101 to the server 105. For example, the applications 201A and 201B on the server 105 and chip card 101, respectively, can each include a capability and understanding of how to generate, transmit, extract, and utilize a MAC transport key. The MAC transport key is analogous to the transport key 203 as previously discussed. However, the MAC transport key is used to encrypt MAC data to be transmitted from the chip card 101 to the server 105, whereas the transport key 203 is used to encrypt payload data to be transmitted from the chip card 101 to the server 105. Use of the transport key 203 and the MAC transport key can be conducted in a simultaneous manner, i.e., communicated in the same transmission packet.

In one embodiment, the MAC transport key is embedded within a MAC portion of the transmission packet, and the transport key 203 is embedded in the payload portion of the transmission packet. The application 201B includes knowledge necessary to how to extract each of the MAC transport key and the transport key 203 from the transmission packet. Thus, in one embodiment, the server 105 is defined to generate the MAC transport key and transmit the MAC transport key to the chip card 101. The chip card 101 is defined to use the MAC transport key to encrypt MAC data to be transmitted from the chip card 101 to the server 105. The chip card 101 is further defined to transmit the encrypted MAC data to the server 105. Once the encrypted MAC data is received at the server 105, the application 201A is capable of decrypting the MAC data using the MAC transport key.

Figure 3:
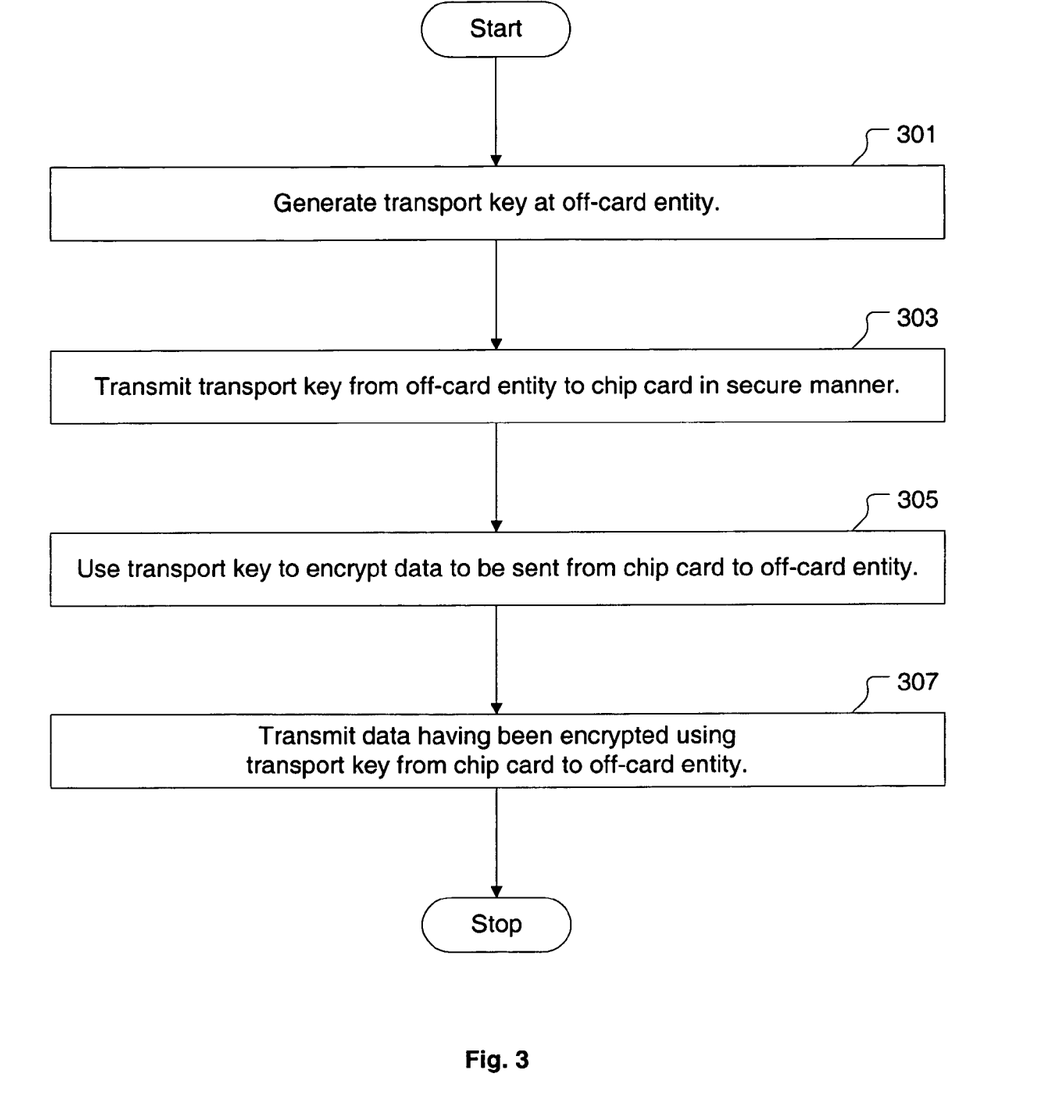
FIG. 3 is an illustration showing a flowchart of a method for securing a data transmission from a chip card to an off-card entity, in accordance with one embodiment of the present invention.

FIG. 3 is an illustration showing a flowchart of a method for securing a data transmission from a chip card to an off-card entity, in accordance with one embodiment of the present invention. In one embodiment, the off-card entity is a back-end server computer system capable of executing an application to enable two-way secure communication with the chip card. It should be appreciated that the back-end server computer system can be a secure server computer system that requires user authentication prior to granting access to the server computer system. Also, in one embodiment, the chip card is a JAVA™ Card compliant with JAVA™ Card Enterprise Software. The chip card can be further defined to implement the functionality set forth in the Open Platform Specification, Version 2.0.1. It should be further appreciated, however, that the method of FIG. 3 can be performed using essentially any off-card entity and essentially any chip card configuration, so long as the off-card entity and chip card are communicably compatible and are each capable of executing program instructions via a processor and storing data via a memory.

The method includes an operation 301 for generating a transport key at the off-card entity. In one embodiment, the transport key is a triple data encryption standard (triple-DES) transport key. In an operation 303, the transport key is transmitted from the off-card entity to the chip card in a secure manner. For example, considering the chip card and off-card entity are compliant with the Open Platform Specification, a mutual authentication process can be performed between the off-card entity and the chip card to establish a secure channel between the off-card entity and the chip card. Then, the established secure channel can be used to transmit the transport key from the off-card entity to the chip card. Also, in one embodiment, the transport key can be included in a payload portion of an application data protocol unit (APDU) command when transmitted from the off-card entity to the chip card. Furthermore, in another embodiment, a session key generated upon establishment of the secure channel can be used to encrypt the transport key prior to transmitting the transport key from the off-card entity to the chip card.

The method further includes an operation 305 for using the transport key at the chip card to encrypt data to be sent from the chip card to the off-card entity. In the embodiment wherein the chip card is compliant with the Open Platform Specification, the chip card can execute a DES_CBC_NO-PAD command to use the transport key to encrypt data to be sent to the off-card entity. In the embodiment wherein the transport key is encrypted using the session key associated with establishment of the secure channel, it should be appreciated that the chip card can use its knowledge of the session key to decrypt the transport key, thus enabling use of the transport key for encryption of the data at the chip card.

The method also includes an operation 307 in which the data having been encrypted at the chip card using the transport key is transmitted from the chip card to the off-card entity. Transmission of the transport key-encrypted data from the chip card to the off-card entity can be performed using a non-secure uplink channel, without causing public exposure of the data represented by the transport key-encrypted data. Once the off-card entity receives the transport key-encrypted data from the chip card, the off-card entity can use its knowledge of the transport key to decrypt the transport key-encrypted data.

The method of FIG. 3 is described above with respect to generation and use of a transport key to protect data to be transmitted from the chip card to the off-card entity. Often the data to be transmitted from the chip card to the off-card entity is accompanied by a message authentication code (MAC). In the event that it becomes desirable to protect the MAC, the same method as described above with respect to FIG. 3 can also be utilized to protect the MAC. More specifically, a MAC transport key can be generated and used to encrypt the MAC at the chip card. Additionally, the method of FIG. 3 can be implemented in a dual manner to simultaneously protect both the data and the MAC to be transmitted from the chip card to the off-card entity. Thus, both the transport key and the MAC transport key can be generated and used to protect the data and the MAC, respectively. In one embodiment, transmission of the transport key and MAC transport key from the off-card entity to the chip card can be performed by embedding the transport key within a payload portion of a transmission packet and the MAC transport key within the MAC portion of the transmission packet.

Figure 4:
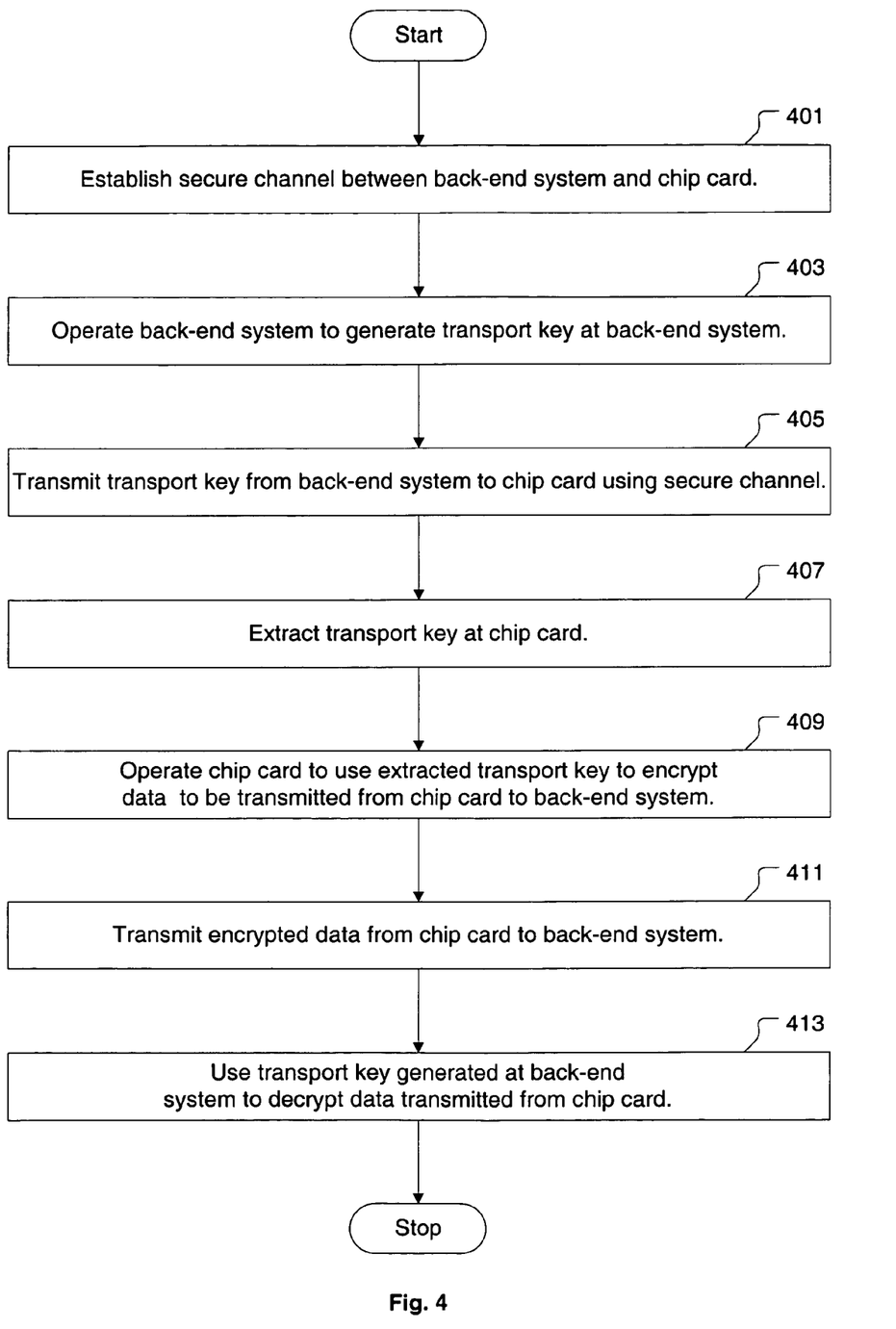
FIG. 4 is an illustration showing a flowchart of a method for securing data transmitted from a chip card compliant with the "Global Platform Open Platform Specification, Version 2.0.1", in accordance with one embodiment of the present invention.

FIG. 4 is an illustration showing a flowchart of a method for securing data transmitted from a chip card compliant with the "Global Platform Open Platform Specification, Version 2.0.1", in accordance with one embodiment of the present invention. The method includes an operation 401 for establishing a secure channel between a back-end system and the chip card. In one embodiment, establishment of the secure channel between the back-end system and the chip card is associated with establishment of a secure session between the back-end system and the chip card. The method also includes an operation 403 for operating the back-end system to generate a transport key at the back-end system. In one embodiment, the transport key is a triple data encryption standard (triple-DES) transport key. It should be appreciated that the back-end system can be operated to generate a unique transport key for each secure session that is established.

The method further includes an operation 405 for transmitting the transport key from the back-end system to the chip card using the secure channel. In one embodiment, the transport key is included in a payload portion of an APDU command when transmitted from the back-end system to the chip card. Also, in another embodiment, a session key associated with the secure session can be used to encrypt the transport key prior to transmission of the transport key from the back-end system to the chip card.

Once the transmission including the transport key is received at the chip card from the back-end system, the method includes an operation 407 for extracting the transport key at the chip card. If the transport key has been encrypted using the session key, the chip card is capable of decrypting the transport key using its knowledge of the session key obtained upon establishment of the secure session. The method further includes an operation 409 for operating the chip card to use the extracted transport key to encrypt data to be transmitted from the chip card to the back-end system. In an operation 411, the transport key-encrypted data is transmitted from the chip card to the back-end system. In one embodiment, transmission of the encrypted data from the chip card to the back-end system can be performed using a non-secure uplink channel without compromising the security of the transport key-encrypted data. Additionally, the method includes an operation 413 for using the transport key previously generated at the back-end system to decrypt the data received at the back-end system from the chip card.

In one embodiment, the chip card in the method of FIG. 4 is a JAVA™ Card compliant with JAVA™ Card Enterprise Software. In this embodiment, the extraction of the transport key at the chip card, i.e., JAVA™ Card, can be directed by an applet executing on the JAVA™ Card. Also in this embodiment, operation of the JAVA™ Card to use the extracted transport key for encrypting data to be transmitted from the JAVA™ Card to the back-end system can be directed by the applet executing on the JAVA™ Card.

In a manner similar to the method of FIG. 3, the method of FIG. 4 can be used in conjunction with transmission of data that is accompanied by a MAC. In the event that it becomes desirable to protect the MAC, the same method as described above with respect to FIG. 4 can also be utilized to protect the MAC. More specifically, a MAC transport key can be generated at the back-end system. Then, the MAC transport key can be transmitted from the back-end system to the chip card using the secure channel. In one embodiment, transmission of the transport key and MAC transport key from the off-card entity to the chip card can be performed by embedding the transport key within a payload portion of a transmission packet and the MAC transport key within the MAC portion of the transmission packet. At the chip card, the MAC transport key can be used to encrypt MAC data to be sent from the chip card to the back-end system. Once the MAC data is encrypted using the MAC transport key, the encrypted MAC data is transmitted from the chip card to the back-end system.

In accordance with the foregoing, an application process operating on the server generates a transport key, e.g., a triple data encryption standard (triple-DES) transport key, to be communicated to a selected chip card application, e.g., applet, via a secure channel. The selected chip card application uses the transport key received from the server to encrypt data to be sent from the chip card to the server. In one embodiment, a chip card being compliant with the "Global Platform Open Platform Card Specification, Version 2.0.1," operates to encrypt the data to be sent to the server using a DES_CBC_NOPAD command and the transport key. Thus, the data sent over the non-secured uplink channel in the direction from the chip card to the server is encrypted. Since a different transport key is generated by the application process operating on the server upon establishment of each secure session, the risk of replay attacks on the transport key-encrypted data is substantially diminished. Thus, the present invention enables secure communication in both directions between the server and the chip card in the context of the Open Platform Specification, wherein the secure communication is critical to the end-to-end security of the system.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for securing a data transmission from a chip card to an off-card entity, comprising:
performing a mutual authentication process to establish a secure channel between the chip card and the off-card entity, wherein establishment of the secure channel includes generation of a session key, wherein the generated session key is known to both the chip card and the off-card entity;
generating a transport key at the off-card entity, wherein the transport key is generated from the session key;
using the session key to encrypt the transport key at the off-card entity;
transmitting the encrypted transport key from the off-card entity to the chip card, wherein the transmitting is performed in a secure manner;
using the session key to decrypt the transport key received at the chip card;
using the transport key at the chip card to encrypt data to be sent from the chip card to the off-card entity; and
transmitting the data having been encrypted using the transport key from the chip card to the off-card entity,
wherein both the chip card and the off-card entity execute respective counterpart applications that each include common capabilities with regard to how the transport key is generated, transmitted, extracted, and utilized.

2. A method for securing a data transmission from a chip card to an off-card entity as recited in claim 1, wherein the off-card entity is a back-end server computer system.

3. A method for securing a data transmission from a chip card to an off-card entity as recited in claim 1, further comprising:
operating the off-card entity to use the transport key generated at the off-card entity to decrypt the data having been encrypted using the transport key.

4. A method for securing a data transmission from a chip card to an off-card entity as recited in claim 1, further comprising:
using the secure channel to transmit the transport key from the off-card entity to the chip card.

5. A method for securing a data transmission from a chip card to an off-card entity as recited in claim 1, wherein the transport key is a triple data encryption standard (triple-DES) transport key.

6. A method for securing a data transmission from a chip card to an off-card entity as recited in claim 1, wherein the chip card executes a DES_CBC_NOPAD command to use the transport key to encrypt data to be sent from the chip card to the off-card entity.

7. A method for securing a data transmission from a chip card to an off-card entity as recited in claim 1, further comprising:
generating a message authentication code (MAC) transport key at the off-card entity;
transmitting the MAC transport key from the off-card entity to the chip card, wherein the transmitting is performed in a secure manner;
using the MAC transport key to encrypt MAC data to be sent from the chip card to the off-card entity; and
transmitting the MAC data having been encrypted using the MAC transport key from the chip card to the off-card entity.

8. A method for securing data transmitted from a chip card, comprising:
establishing a secure channel between a back-end system and the chip card, wherein establishing the secure channel includes generation of a session key, wherein the generated session key is known to both the chip card and the off-card entity;
operating the back-end system to generate a transport key at the back-end system, wherein the transport key is generated from the session key;
using the session key to encrypt the transport key at the back-end system;
transmitting the encrypted transport key from the back-end system to the chip card using the secure channel;
using the session key to decrypt the transport key received at the chip card;
extracting the transport key at the chip card;
operating the chip card to use the extracted transport key to encrypt data to be transmitted from the chip card to the back-end system;
transmitting the encrypted data from the chip card to the back-end system; and
using the transport key generated at the back-end system to decrypt the data having been transmitted from the chip card to the back-end system,
wherein both the chip card and the back-end system execute respective counterpart applications that each include common capabilities with regard to how the transport key is generated, transmitted, extracted, and utilized.

9. A method for securing data transmitted from a chip card as recited in claim 8, wherein the transport key is a triple data encryption standard (triple-DES) transport key.

10. A method for securing data transmitted from a chip card as recited in claim 8, wherein the transport key is included in a payload portion of an application data protocol unit (APDU) command when transmitted from the back-end system to the chip card.

11. A method for securing data transmitted from a chip card as recited in claim 8, wherein transmitting the encrypted data from the chip card to the back-end system is performed using a non-secure uplink channel.

12. A method for securing data transmitted from a chip card as recited in claim 8, wherein the back-end system is operated to generate a unique transport key for each secure session, wherein establishment of the secure channel between the back-end system and the chip card is associated with establishment of a secure session between the back-end system and the chip card.

13. A method for securing data transmitted from a chip card as recited in claim 8, wherein the extraction of the transport key at the chip card is directed by an applet executing on the chip card, and wherein the operation of the chip card to use the extracted transport key to encrypt data to be transmitted from the chip card to the back-end system is directed by the applet executing on the chip card.

14. A method for securing data transmitted from a chip card as recited in claim 8, further comprising:
generating a message authentication code (MAC) transport key at the back-end system;
transmitting the MAC transport key from the back-end system to the chip card using the secure channel;
using the MAC transport key to encrypt MAC data to be sent from the chip card to the back-end system; and
transmitting the MAC data having been encrypted using the MAC transport key from the chip card to the back-end system.

15. A system for transmitting data between a chip card and an off-card entity, comprising:

a server computer system defined to establish a secure channel with a chip card and generate a session key upon established of the secure channel, the server computer system further defined to execute an application for generating a transport key from the session key, the server computer system further defined to use the generated session key to encrypt the transport key prior to transmission of the transport key to the chip card through the secure channel;

a chip card reader connected to communicate with the server computer system; and a chip card connected to communicate with the chip card reader, wherein the chip card is capable of communicating with the server through the chip card reader, the chip card being defined to receive the transport key from the server computer system through a secure channel, the chip card further defined to use the session key to decrypt the received transport key, the chip card further defined to execute an application directing use of the transport key to encrypt data to be communicated from the chip card to the server computer system, wherein both the chip card and the server computer system execute respective counterpart applications that each include common capabilities with regard to how the transport key is generated, transmitted, extracted, and utilized.

16. A system for transmitting data between a chip card and an off-card entity as recited in claim 15, wherein the server computer system is defined to generate a message authentication code (MAC) transport key and transmit the MAC transport key to the chip card, the chip card being defined to use the MAC transport key to encrypt MAC data and transmit the encrypted MAC data to the server computer system.

* * * * *